United States Patent [19]

Butler

[11] Patent Number: 5,395,529

[45] Date of Patent: Mar. 7, 1995

[54] APPARATUS FOR THE TREATMENT OF SEWAGE

[76] Inventor: James P. J. Butler, 44 Templemichael Glebe, Longford, Ireland

[21] Appl. No.: 106,431

[22] Filed: Aug. 13, 1993

[30] Foreign Application Priority Data

Aug. 24, 1992 [IE] Ireland .................. S922606

[51] Int. Cl.⁶ ................................ C02F 3/08
[52] U.S. Cl. .................... 210/619; 210/151; 210/262
[58] Field of Search ............ 210/150, 151, 259, 261, 210/262, 521, 619, 623, 802, 806

[56] References Cited

U.S. PATENT DOCUMENTS

| 1,732,386 | 10/1929 | Sprockhoff | 210/521 |
| 2,553,228 | 5/1951 | Yonner | 210/261 |
| 3,704,783 | 12/1972 | Antonie | 210/619 |
| 3,849,304 | 11/1974 | Torpey et al. | 210/619 |
| 3,932,273 | 1/1976 | Torpey et al. | 210/619 |
| 3,976,568 | 8/1976 | Torpey et al. | 210/619 |
| 4,160,736 | 7/1979 | Prosser | 210/150 |
| 4,935,130 | 6/1990 | Sieksmeyer et al. | 210/151 |

FOREIGN PATENT DOCUMENTS

| 202283 | 3/1983 | Denmark . |
| 8984 | 1/1984 | Denmark . |
| 0097419 | 1/1984 | European Pat. Off. . |
| 161077 | 11/1985 | European Pat. Off. . |
| 0249433 | 11/1990 | European Pat. Off. . |
| 2852966 | 10/1979 | Germany . |
| 3409111 | 9/1985 | Germany . |
| 1394552 | 5/1975 | United Kingdom . |
| 1408235 | 10/1975 | United Kingdom . |
| 1509712 | 5/1978 | United Kingdom . |
| 2118535 | 11/1983 | United Kingdom . |
| 8100101 | 1/1981 | WIPO . |

Primary Examiner—Christopher Upton
Attorney, Agent, or Firm—Vaden, Eickenroht, Thompson, Boulware & Feather

[57] ABSTRACT

A sewage treatment apparatus is disclosed comprising a tank (11) for receiving sewage effluent to be treated defining an inlet port (1) and an outlet port (8), compartmentalised so as to define a first sewage effluent settlement zone (3) below the level of the inlet port (1), a second sewage effluent settlement zone (7) below the level of the outlet port (8) and a trough compartment (14) such that the first sewage effluent settlement zone (3) is in communication with the trough compartment (14), and the trough compartment (14) is in communication with the second sewage effluent settlement zone (7); a first arrangement of substantially parallel baffle plates (16) disposed in the first sewage effluent settlement zone (3) between the inlet port (1) and the trough compartment (14); a rotating biological contactor (4) mounted for rotation in the trough compartment (14); a second arrangement of substantially parallel baffle plates (20) disposed in the second sewage effluent settlement zone (7) between the trough compartment (14) and the outlet port (8) whereby the arrangements of baffle plates are so disposed to promote a laminar flow of sewage effluent through the respective first and second sewage effluent settlement zones (3 and 7). A process for the treatment of sewage effluent is also disclosed.

12 Claims, 4 Drawing Sheets

APPARATUS FOR THE TREATMENT OF SEWAGE

BACKGROUND OF THE INVENTION

The present invention relates to an apparatus for the treatment of sewage effluent and particularly such apparatus comprising a rotating biological contactor. Various types of rotating biological contactor are known for example that described in my earlier European Patent Specification No. 0 249 433.

Hitherto, rotating biological contactors have been constructed in very many different ways but essentially comprise an open rotor structure of semi-buoyant lightweight material which is rotatable on a shaft and which is partly submerged in the effluent to be treated. The rotor includes or defines a structure having a high surface area providing a suitable substrate for biomass growth, such as a series of discs which may be embossed (e.g. GB 2,118,535A), or divided into sectors (e.g. GB 1,394,552), a drum defined by an open mesh enclosing loose particulate media (e.g. GB 1,408,235), or sheets or tubes wound in a spiral or helical fashion about the shaft (e.g. GB 1,509,712, EP 0,198,451A). It has also been proposed (e.g. WO 81/00101) to use a spiral or helical rotor structure to provide nett lift to the effluent during rotation in the manner of an Archimedes Screw.

Danish Patent Application 2002/83 discloses a drum structure having two sets of spiral vanes wound in opposite directions and divided by a single axially mounted disc which defines a partition. The inlets and outlets are located at opposite ends of the drum near the shaft and not at the periphery of the drum end faces. A lifting and lowering effect is obtained by the oppositely wound spiral vanes in this arrangement to pass effluent through the contactor. A certain minimum quantity of effluent is present in the drum at any given time to make the drum more buoyant and so reduce the load on the shaft.

Danish Patent Application 0089/84 discloses a non-partitioned drum having a spiral vane construction which has inlets near the periphery of the drum.

DE 3 409 111 A describes a contactor having a series of discs which sandwich between them spiral vanes but wherein no enclosing shell or drum structure is provided. It is necessary to almost submerge the contactor in this instance which increases the load on the shaft.

U.S. Pat. No. 4,160,736 describes a drum structure having closely spaced discs mounted on a shaft with a spiral vane arrangement at each end of the drum having the function of carrying effluent towards inlets and outlets which are located in the axial region at the respective end faces of the drum. A relatively small quantity of effluent is held in the drum at any given time which acts as a "rotating trickling filter" and does not provide the same positive aeration by virtue of churning action as provided by a contactor having an enclosed spiral vane arrangement.

It is also known to utilize a rotating biological contactor in conjunction with one or more independent settlement tanks.

It is an object of the present invention to provide an apparatus which can effect the efficient treatment of raw sewage effluent so as to render it safe for discharge by spreading on land or by introduction into natural waterways.

It is another object of the invention to provide compact apparatus including a rotating biological contactor for removing substantially all particulate or solids material from sewage effluent without the necessity for separate "in-line" settlement tanks, which take up considerable space.

It is a further object of the invention to provide sufficient aeration of effluent combined with maximum contact with biological agents in order to reduce the biological oxygen demand (BOD) of the effluent to a safe level.

SUMMARY OF THE INVENTION

A sewage treatment apparatus of the present invention comprises:

a tank for receiving sewage effluent to be treated defining an inlet port and an outlet port, compartmentalised so as to define a first sewage effluent settlement zone below the level of the inlet port, a second sewage effluent settlement zone below the level of the outlet port and a trough compartment therebetween, such that the first settlement zone is in communication with the trough compartment, and the trough compartment is in communication with the second sewage effluent settlement zone, a first arrangement of substantially parallel baffle plates disposed in the first sewage effluent settlement zone between the inlet port and the trough compartment, a rotating biological contactor mounted for rotation in the trough compartment, a second arrangement of substantially parallel baffle plates disposed in the second sewage effluent settlement zone between the trough compartment and the outlet port, whereby the arrangements of baffle plates are so disposed to promote a laminar flow of sewage effluent through the respective first and second sewage effluent settlement zones.

The present invention also relates to a process for the treatment of sewage effluent comprising the steps of:

passing untreated sewage effluent into a tank through an inlet port defined therein so as to pass into a first sewage effluent settlement zone defined by the tank, having an arrangement of substantially parallel baffle plates disposed therein so as to settle out a substantial amount of particulate matter suspended in the effluent, passing the thus treated effluent from the first sewage effluent settlement zone into an adjacent trough compartment defined within the tank, subjecting the effluent in the trough compartment to aeration by a rotating biological contactor, semi-submersed, and mounted for rotation in the trough compartment, passing the thus treated effluent from the trough compartment to an adjacent second sewage effluent settlement zone defined within the tank, passing the effluent through a second sewage effluent settlement zone defined by the tank and having a second arrangement of substantially parallel baffle plates disposed therein so as to further settle out suspended particulate matter, and removing the thus treated effluent from the second sewage effluent settlement zone via an outlet port defined therein, and periodically removing collected particulate matter from the tank.

The first arrangement of substantially parallel baffle plates is preferably disposed of in a substantially vertical manner, in use.

The second arrangement of substantially parallel baffle plates is preferably disposed at an angle of from 1° to 45° to a vertical plane, in use.

Most preferably, the second arrangement of substantially parallel baffle plates is disposed at an angle of about 30° to a vertical plane, in use.

The spacing between the baffle plates in each arrangement is preferably within the range of from 10 to 50 mm, most preferably about 25 mm. The presence of the first and second arrangements of substantially parallel baffle plates results in a laminar flow effect which substantially reduces the amount of particulate material and suspended solids in the treated effluent.

Preferably, the tank defines a sump below by the first sewage effluent settlement zone and further extending below the trough compartment and the second sewage effluent settlement zone across the base of the tank. Preferably, the second sewage effluent settlement zone is in communication with the sump, and comprises a valve allowing settled matter from the second sewage effluent settlement zone to pass into the sump when desired.

In a second embodiment, the present invention further relates to an apparatus for the treatment of sewage effluent, comprising:
- a tank for receiving sewage effluent to be treated defining an inlet port and an outlet port, compartmentalized so as to define a first sewage effluent settlement zone below the level of the inlet port, a second sewage effluent settlement zone below the level of the outlet port and a trough compartment therebetween, such that the first settlement zone is in communication with the trough compartment, and the trough compartment is in communication with the second sewage effluent settlement zone,
- a first arrangement of substantially parallel baffle plates disposed in the first sewage effluent settlement zone between the inlet port and the trough compartment
- a rotating biological contactor comprising twin rotors mounted for rotation on a common shaft in the trough compartment,
- a second arrangement of substantially parallel baffle plates disposed in the second sewage effluent settlement zone between the trough compartment and the outlet port, whereby the arrangements of baffle plates are so disposed to promote a laminar flow of sewage effluent through the respective first and second sewage effluent settlement zones.

Preferably, the trough compartment is subdivided by a partition wall separating the two rotors, but adapted to allow communication of sewage effluent treated by the first rotor to pass through for treatment by the second rotor.

Preferably, communication through the partition wall and from the trough compartment to the second sewage effluent settlement zone is via a respective opening defined in each case by a weir structure.

The sewage treatment apparatus may also comprise a lid and an access opening defined therein, wherein the access opening facilitates removal of accumulated material from the tank.

BRIEF DESCRIPTION OF THE DRAWINGS

Preferred embodiments of the sewage treatment apparatus of the present invention will now be described with reference to the accompanying drawings in which.

In the drawings, the arrows indicate the direction of flow of effluent through the apparatus, the broken lines indicate the level of effluent at various stages and like numbers denote equivalent parts.

DETAILED DESCRIPTION OF THE INVENTION

Figure 1:
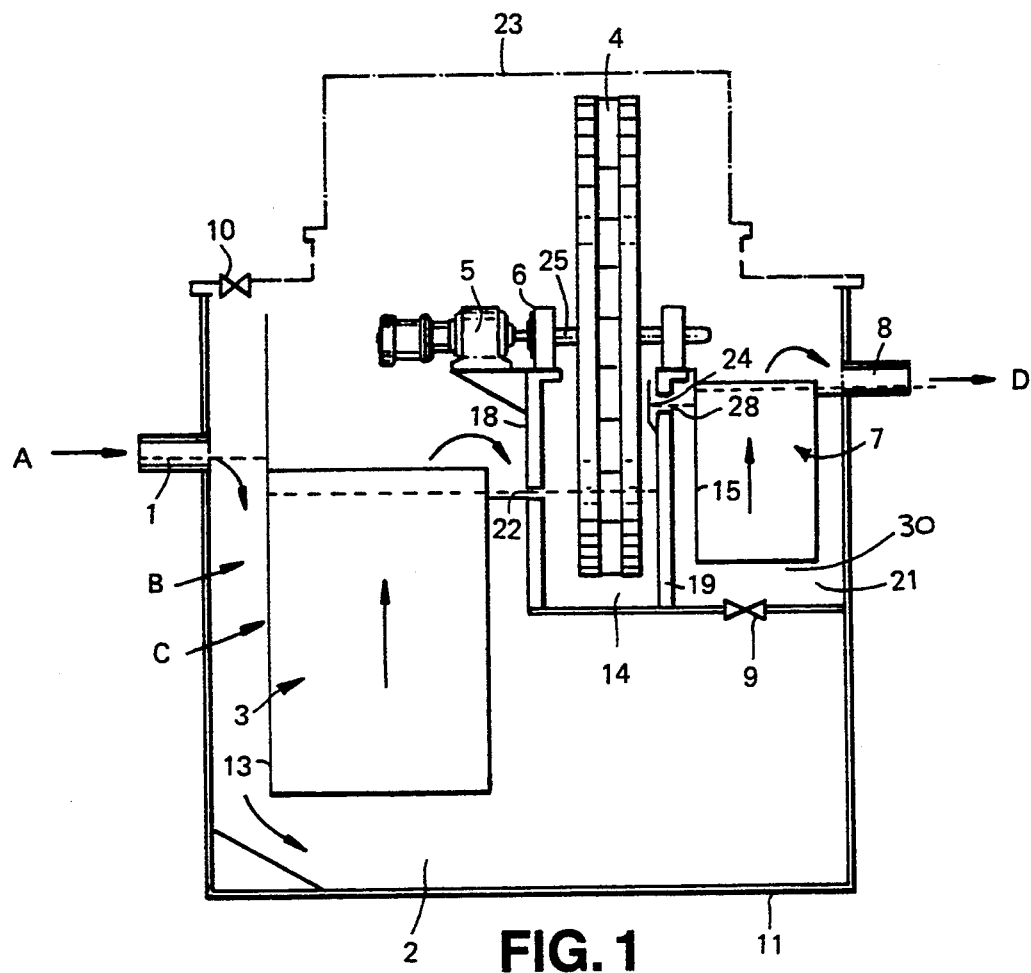
FIG. 1 is side elevation of a preferred embodiment.

The apparatus comprises a tank 11 through which sewage effluent is directed by means of several baffles and other devices. An inlet port 1 is provided for introduction of effluent into the tank 11. The effluent is guided downwards by a baffle 13 into a sludge storage area or sump 2 having a first sewage effluent settlement zone 3, where sludge and other relatively dense material collects. Under the influence of the flow through the apparatus, the effluent proceeds through a first arrangement of substantially parallel baffle plates 16 (shown in FIG. 2) disposed in the settlement zone 3. The substantially parallel baffle plates 16 shown in FIG. 2 may be arranged in a substantially vertical manner or may be at an angle to the vertical. On flowing through the first settlement zone 3, via opening 22, the effluent reaches a trough compartment 14 in which a rotating biological contactor 4 is semi-submersed. The rotating biological contactor 4 is mounted on a shaft 25 by means of bearings 6 located on top of walls 18, 19 which define the trough 14, coupled to a motor 5 by means of a coupling. The rotating biological contactor 4 aerates the sewage effluent and provides for contact between the effluent and a microbiological growth on the contactor 4. This method is well known for reducing the biological oxygen demand (BOD) of sewage effluent. After treatment by the rotating biological contactor 4 the treated effluent proceeds to a second settlement zone 7, which communicates with the trough compartment 14 by means of an opening 28 defined by the partition wall 19. As described in my European Patent Specification No. 0 249 433, and referring to FIGS. 3–6 of the drawings, a rotator 51 for the biological contactor 4 comprises a drum 52 made of glass-reinforced plastics material mounted on a shaft 53 made of mild steel by means of hub mountings 54. The drum 52 consists of an outer shell comprising a curved surface with raised and open-ended transverse corrugations 55, with two circular end faces 56. The end faces 56 are perforated with regularly spaced inlet holes 57 near their circumference, and outlet holes 58 adjacent to the shaft 53.

Figure 5:
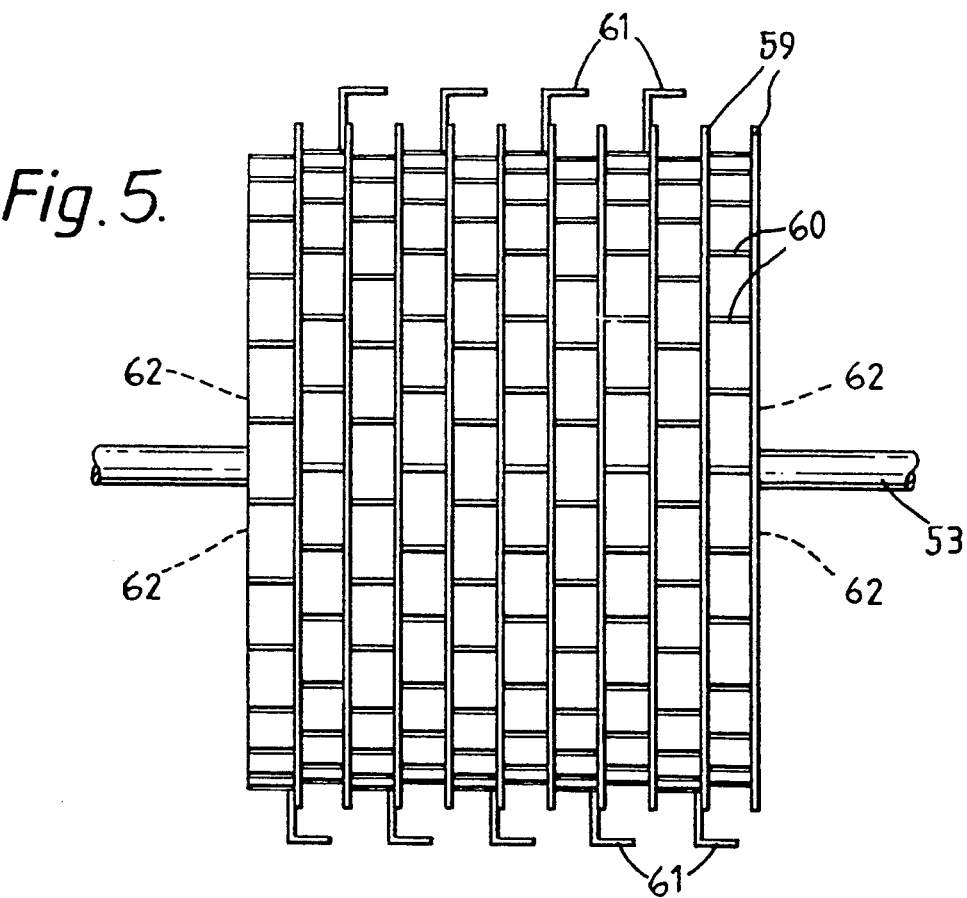
FIG. 5 is a side elevation, as in FIG. 3, with the outer drum covering removed.
Figure 6:
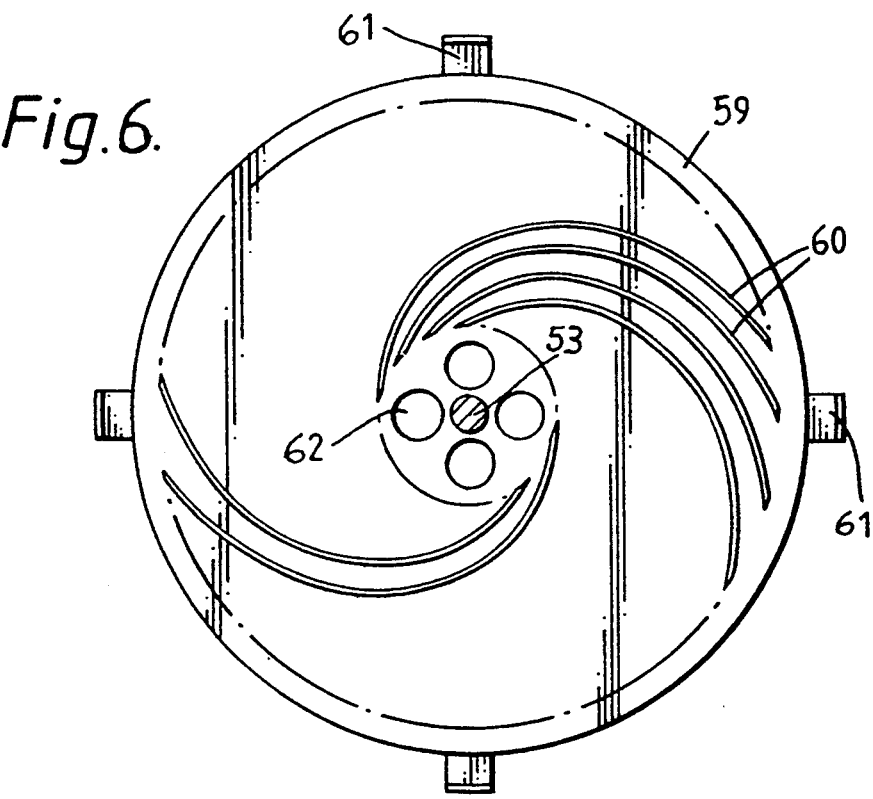
FIG. 6 is an end elevation, as in FIG. 4, with the outer drum covering removed.

FIGS. 5 and 6 illustrate the internal structure of the rotor 51 which consists of a series of closely packed discs 59 each having adhered thereto a series of vanes 60 arranged in a spiral pattern about the shaft 53. The discs 59 are fixed to the internal curved surface of the drum by means of tabs 61. The discs 59 are of slightly smaller diameter than the end faces 56, leaving a passageway 63 (see FIG. 5) along the length of the drum leading from inlet holes 57 adjacent to the internal curved surface of the drum. The tabs 61 on successive discs are preferably staggered to produce a baffle effect in passageway 63. Each disc 59 has a number of holes 62 between the shaft 53 and the innermost ends of the spiral vanes 60.

As shown by this structure, effluent is discharged from the rotating biological contactor 4 through apertures (not shown) located close to its axis of rotation, i.e. shaft 25. This stream of effluent is guided through the opening 28 by a weir structure 24. The treated effluent flow is then directed through the second settlement zone 7 by a baffle 15 and a second arrangement of substantially parallel baffle plates 20 (shown in FIG. 2), similar to the arrangement of plates in the first settlement zone 3.

Both the first and second arrangements of substantially parallel baffle plates 16 and 20 have the effect of creating laminar flow conditions in the first and second settlement zones 3 and 7, and this results in the separation of particulate material or suspended solids from the effluent stream under gravity in the boundary layer between the shear boundary and the plate surface. The treated effluent flows out through outlet port 8 to be disposed of as required. It should be noted that a nett lift of effluent is achieved by flow through the rotating biological contactor without the need for an additional pump, as described in my European Patent Specification No. 0 249 433.

The tank 11 is fitted with a lid 23. A valve 9 is provided in the base 21 of the second settlement zone 7, facilitating communication with the sump 2, typically the valve 9 is a "butterfly valve" which is opened periodically for a short duration by means of a timer-controlled valve opening mechanism. Typically, an open time of 30 to 60 seconds every 6 hours will suffice for the purpose of desludging or flushing the second settlement zone 7. The contactor 4 is arranged to create a nett lift of effluent passing between the first and second settlement zones 3 and 7, thereby allowing desludging of the second settlement zone 7 to take place under the action of gravity.

The flow of effluent through the basal zone 30 flushes accumulated solids through the valve 9 into the sludge storage compartment or sump 2. The opening 10 in the lid 23, allows access to the sump 2 which may be cleaned by pumping out accumulated material for example by means of a vacuum pump once every one to three months as necessary.

Figure 2:
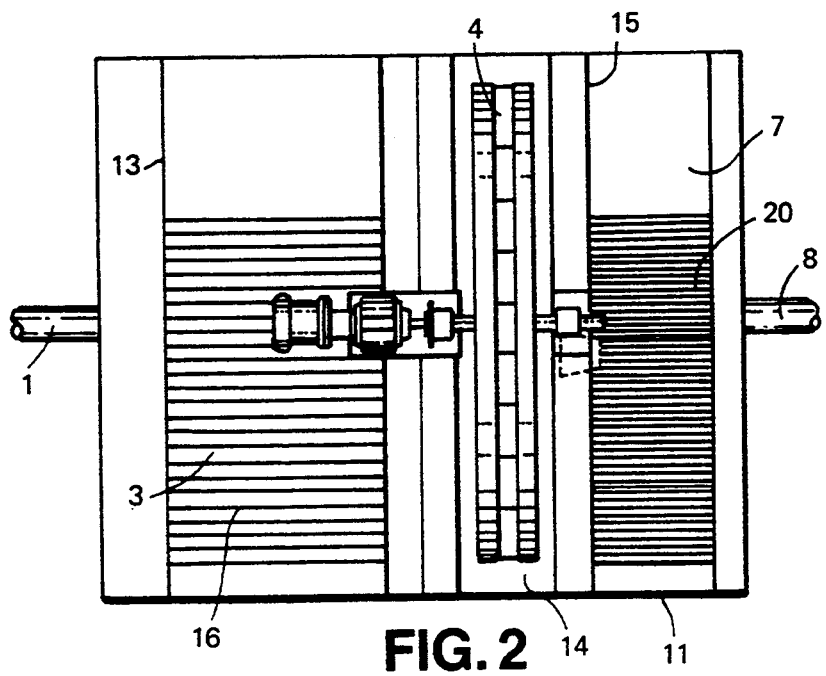
FIG. 2 is a plan view of the embodiment shown in FIG. 1.

FIG. 2 is a plan view of the apparatus in FIG. 1 showing the first and second arrangements of substantially parallel baffle plates 16, 20 in the settlement zones 3 and 7. The baffle plates in the second arrangement or plate settler 20 are inclined. Typically they are inclined at an angle of about 30° to the vertical. The plates of the first plate settler 3 are substantially vertical.

Figure 3:
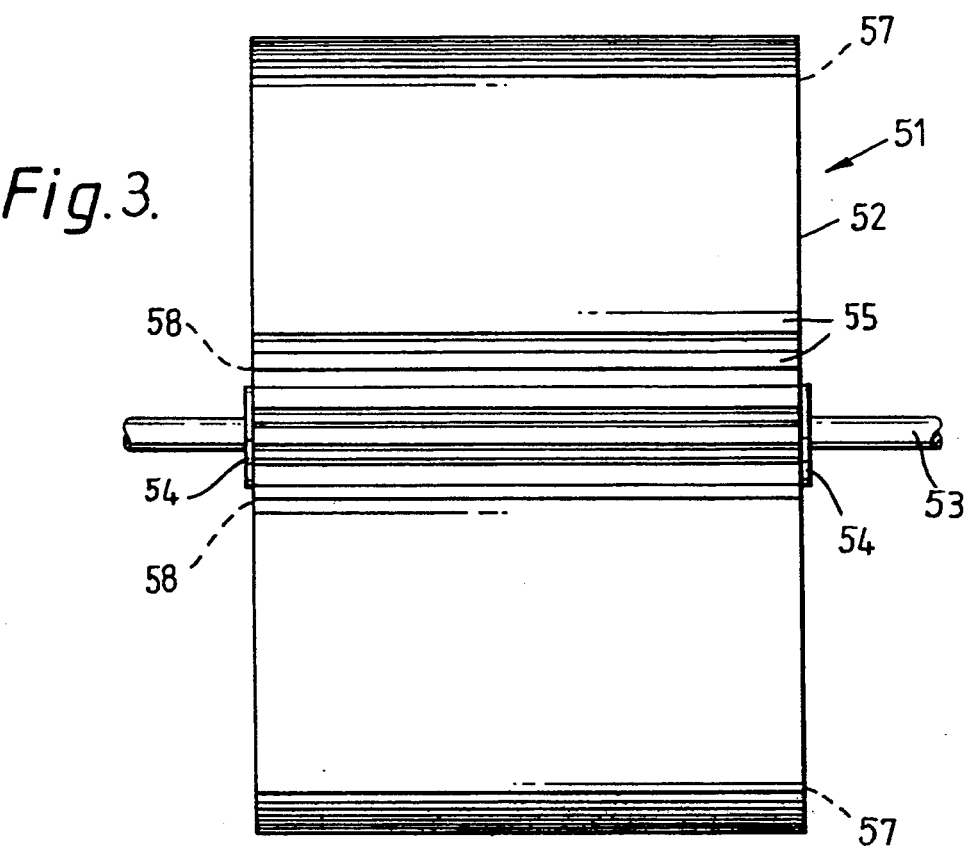
FIG. 3 is a side elevation of a rotor for a rotating biological contactor.
Figure 4:
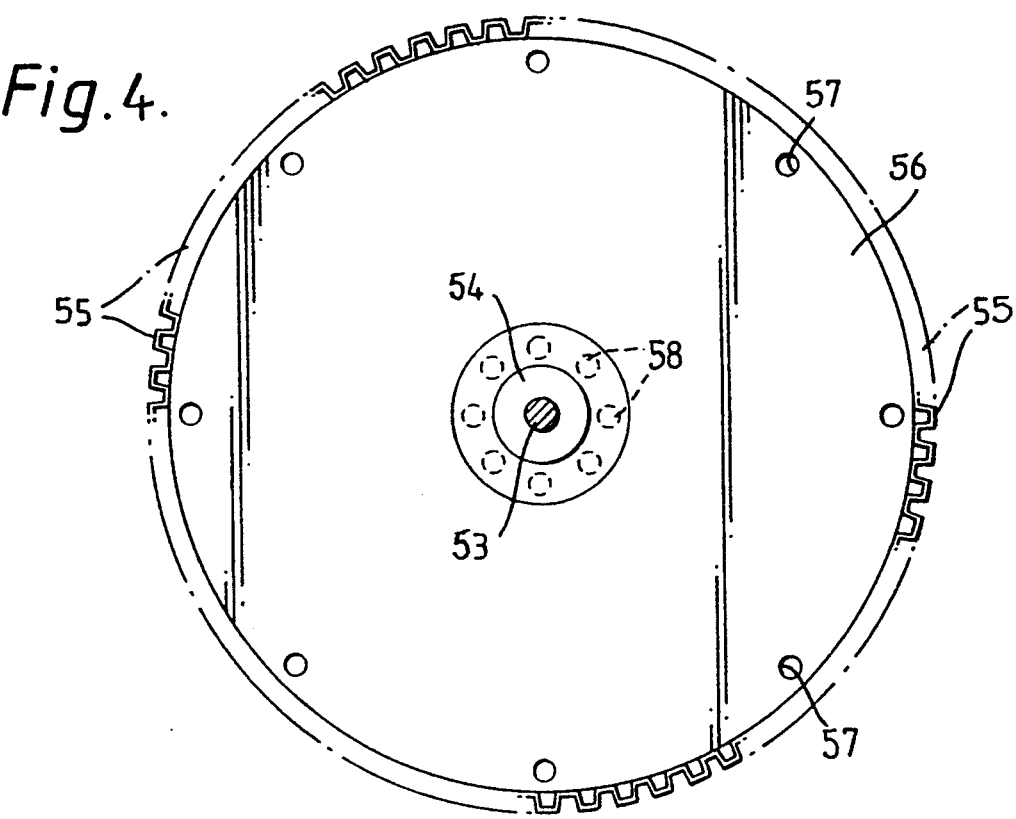
FIG. 4 is an end elevation of the rotor shown in FIG. 3.
Figure 7:
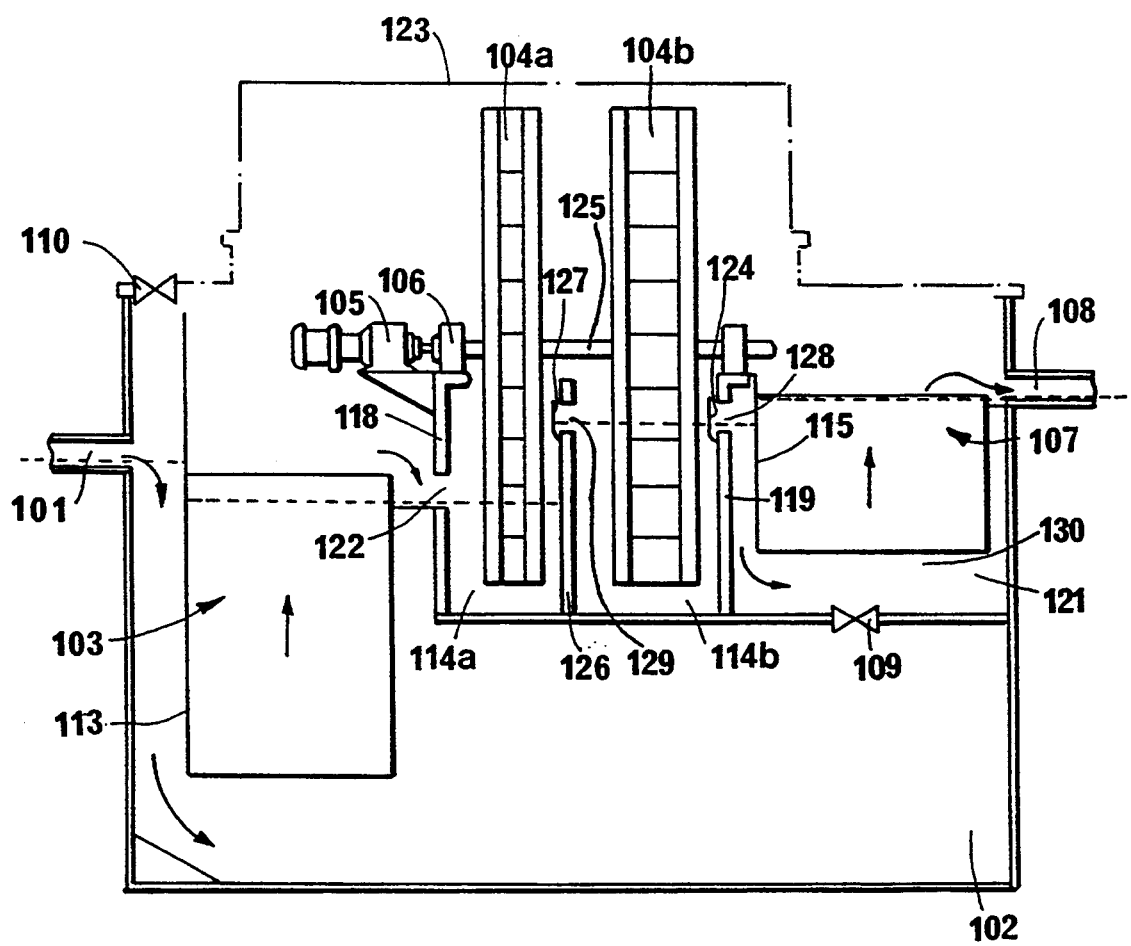
FIG. 7 is a side elevation of a second preferred embodiment of the apparatus.

In FIG. 3 like numbers correspond to equivalent parts in FIG. 1. FIG. 7 shows a preferred embodiment of the invention in which the rotating biological contactor 104 comprises two rotors 104a and 104b each located within a separate trough compartment 114a, 114b which communicate through opening 129 defined by partition wall 126 which separates the trough compartments 114a and 114b. Weir structure 127 directs effluent from rotor 104a through opening 125 into the second trough compartment 114b. This embodiment operates in a substantially identical manner as that in the earlier Figures with the exception that the effluent passes through two rotors 104a, 104b thus increasing the contact surface area between the effluent and microbiological growth.

The sewage treatment apparatus of the present invention is effective in reducing BOD and suspended solids (SS) levels. Tables 1 and 2 show the results of tests carried out at two different sites, at various stages in the treatment process of the present invention.

TABLE 1

| Parameter (Units) | Sample taken from: | | | | % Reduction |
|---|---|---|---|---|---|
| | Pump sump (A) | Inlet Supply (Pumped) (B) | Inlet Zone (Side) (C) | Final effluent (D) | |
| BOD * (mg/l) | 246 | 245 | 243 | 15 | 94 |
| COD * (mg/l) | 668 | 657 | 587 | 78 | 88 |
| SS * (p.p.m.) | 436 | 180 | 204 | 11 | 97 |
| AMMONIA (p.p.m.) | 24.4 | 23 | 23.1 | 2.6 | 91 |

* BOD = biological oxygen demand; COD = chemical oxygen demand; SS = suspended solids.

With reference to Table 1 the sample readings (A) are the initial values of the untreated sewage effluent; sample readings (B) are taken from the main flow of the pumped inlet effluent supply; readings (C) are taken from the side of the inlet zone and readings (D) are taken from the output effluent after treatment is completed.

TABLE 2

| Parameter (Units) | Sample taken from: | | | | % Reduction |
|---|---|---|---|---|---|
| | Pump sump | Inlet Supply (Pumped) | Inlet Zone (Side) | Final effluent | |
| BOD * (mg/l) | 278 | 233 | 198 | 11 | 96 |
| COD * (mg/l) | 796 | 722 | 592 | 65 | 92 |
| SS * (p.p.m.) | 396 | 312 | 266 | 13 | 97 |
| AMMONIA (p.p.m.) | 65.3 | 70.5 | 66.2 | 2.02 | 97 |

* BOD = biological oxygen demand; COD = chemical oxygen demand; SS = suspended solids.

The sewage treatment apparatus of the present invention has the advantage of being compact, and the automatic desludging feature of the second compartment allows sludge removal from the tank at less frequent intervals, generally reducing maintenance costs.

I claim:

1. Apparatus for the treatment of sewage effluent, comprising:

a tank for receiving sewage effluent to be treated comprising sidewalls and a base, the sidewalls defining an inlet port and an outlet port, a first sewage effluent settlement compartment defined by the tank sidewalls and base below the level of the inlet port, a second sewage effluent settlement compartment defined by a tank sidewall, compartment sidewall and a base member, below the level of this outlet port, and a trough compartment defined by compartment sidewalls and a base member located between the first and second settlement compartments, such that the first settlement compartment is in communication with the trough compartment, and the trough compartment is in communication with the second settlement compartment, a first arrangement of substantially parallel baffle plates disposed in the first settlement compartment between the inlet port and the trough compartment, a biological contactor mounted for rotation in the trough compartment including means for lifting effluent to be treated between the first and second compartments, a second arrangement of substantially parallel baffle plates disposed in the second settlement compartment between the trough compartment and the outlet port, whereby the arrangements of baffle plates are so disposed to promote laminar flow of sewage effluent through the respective first and second settlement compartments.

2. Apparatus according to claim 1, wherein the first arrangement of substantially parallel baffle plates is disposed in a substantially vertical plane, in use.

3. Apparatus according to claim 1, wherein the second arrangement of substantially parallel baffle plates is disposed at an angle of from 1° to 45° to a vertical plane, in use.

4. Apparatus according to claim 3, wherein the second arrangement of substantially parallel baffle plates is disposed at an angle of about 30° to a vertical plane, in use.

5. Apparatus according to claim 1, wherein the said base of the tank defines a sump for storage of settled matter within the first settlement compartment and further extending below the base member of the trough compartment and the second settlement compartment across the base of the tank.

6. Apparatus according to claim 5, wherein the second settlement compartment is in communication with the sump, and comprises a valve allowing settled matter from the second settlement compartment to pass into the sump when desired.

7. Apparatus for the treatment of sewage effluent, comprising:

a tank for receiving sewage effluent to be treated comprising sidewalls and a base, the sidewalls defining an inlet port and an outlet port, a first sewage effluent settlement compartment defined by the tank sidewalls and base below the level of the inlet port, a second sewage effluent settlement compartment defined by a tank sidewall, compartment sidewall and a base member, below the level of the outlet port and a trough compartment defined by compartment sidewalls and a base member located between the first and second settlement compartments, such that the first settlement compartment is in communication with the trough compartment, and the trough compartment is in communication with the second settlement compartment, a first arrangement of substantially parallel baffle plates disposed in the first settlement compartment, between the inlet port and the trough compartment, a rotating biological contractor comprising twin rotors, each having a sandwiched spiral vane construction and mounted for rotation on a common shaft in the trough compartment, a second arrangement of substantially parallel baffle plates disposed in the second settlement compartment between the trough compartment and the outlet port, whereby the arrangements of baffle plates are so disposed to promote a laminar flow of sewage effluent through the respective first and second settlement compartments.

8. Apparatus according to claim 7 in which the trough compartment is subdivided by a partition wall separating the two rotors but adapted to allow communication of sewage effluent treated by the first rotor to pass through for treatment by the second rotor.

9. Apparatus according to claim 8 wherein communication through the said partition wall and from the trough compartment to the second settlement compartment is via a respective opening defined in each case by a weir structure.

10. A process for the treatment of sewage effluent comprising the steps of passing untreated sewage effluent into a tank through an inlet port defined in a sidewall therein so as to pass into a first settlement compartment defined by the tank sidewalls and base, having an arrangement of substantially parallel baffle plates disposed therein so as to settle out a substantial amount of particulate matter suspended in the effluent, passing the thus treated effluent from the first settlement compartment into an adjacent trough compartment defined by compartment sidewalls and a base member within the tank, subjecting the effluent in the trough compartment to aeration by a rotating biological contactor, including means to lift effluent to be treated between first and second compartments semi-submersed, and mounted for rotation in the trough compartment, passing the thus treated effluent from the trough compartment to an adjacent second settlement compartment defined by compartment sidewalls and a base member within the tank, passing the effluent through the second settlement compartment and a second arrangement of substantially parallel baffle plates disposed therein so as to further settle out suspended particulate matter, and removing the thus treated effluent from the second settlement compartment via an outlet port defined therein, and periodically removing collected particulate matter from the tank.

11. A process according to claim 10, in which collected particulate matter is removed from a sump defined by the tank sidewall and base within the first settlement compartment of the tank by pumping through an access opening defined by an upper portion of the tank.

12. A process according to claim 11, whereby collected particulate matter in the second settlement compartment is allowed to pass by gravity through an opening defined in the said base member thereof into the sump, such that the said opening is closeable by an automatic valve mechanism.

* * * * *